United States Patent
Aoki

(10) Patent No.: US 10,315,192 B2
(45) Date of Patent: Jun. 11, 2019

(54) HONEYCOMB STRUCTURE

(71) Applicant: NGK INSULATORS, LTD., Nagoya (JP)

(72) Inventor: Takashi Aoki, Nagoya (JP)

(73) Assignee: NGK Insulators, Ltd., Nagoya-City (JP)

( * ) Notice: Subject to any disclaimer, the term of this patent is extended or adjusted under 35 U.S.C. 154(b) by 0 days.

(21) Appl. No.: 15/426,332

(22) Filed: Feb. 7, 2017

(65) Prior Publication Data
US 2017/0232429 A1 Aug. 17, 2017

(30) Foreign Application Priority Data
Feb. 16, 2016 (JP) .................. 2016-027240

(51) Int. Cl.
*B01D 37/02* (2006.01)
*B01J 35/04* (2006.01)
*B01D 46/24* (2006.01)
*B01D 53/94* (2006.01)
*B01J 37/02* (2006.01)
*F01N 3/10* (2006.01)
(Continued)

(52) U.S. Cl.
CPC .......... *B01J 35/04* (2013.01); *B01D 46/2429* (2013.01); *B01D 46/2474* (2013.01); *B01D 53/945* (2013.01); *B01D 53/9445* (2013.01); *B01J 35/0006* (2013.01); *B01J 37/0201* (2013.01); *B01J 37/0244* (2013.01); *F01N 3/101* (2013.01); *F01N 3/2842* (2013.01); B01D 2255/9032 (2013.01); B01D 2255/915 (2013.01); B01D 2255/9155 (2013.01); B01D 2258/012 (2013.01); B01J 23/40 (2013.01); Y02T 10/22 (2013.01)

(58) Field of Classification Search
None
See application file for complete search history.

(56) References Cited

U.S. PATENT DOCUMENTS 6,753,294 B1 * 6/2004 Brisley .............. B01D 53/9431
502/439
7,244,284 B2 7/2007 Miwa et al.
(Continued)

FOREIGN PATENT DOCUMENTS

JP 2003-254034 A1 9/2003

*Primary Examiner* — Adam Krupicka
(74) *Attorney, Agent, or Firm* — Burr & Brown, PLLC

(57) ABSTRACT

A honeycomb structure includes a honeycomb substrate having porous partition walls defining a plurality of cells extending from one end face to the other end face, and one-side plugging portions configured to plug the cells in the one end face in accordance with a predetermined arrangement standard, and the partition walls include catalyst impregnated partition walls formed in a first region of a predetermined length extending from the one end face in which the one-side plugging portions are provided, along an axial direction of the honeycomb substrate and formed by impregnating a catalyst into partition wall inner portions, and catalyst layer partition walls formed in a second region of a predetermined length extending from the other end face along the axial direction of the honeycomb substrate and having catalyst layers which coat partition wall surfaces with the catalyst in the form of layers.

4 Claims, 4 Drawing Sheets

(51) Int. Cl.
    *F01N 3/28*      (2006.01)
    *B01J 35/00*      (2006.01)
    *B01J 23/40*      (2006.01)

(56) References Cited

U.S. PATENT DOCUMENTS

| | | | |
|---|---|---|---|
| 7,947,231 B2* | 5/2011 | Ohno | B01J 35/04 422/180 |
| 2001/0026838 A1* | 10/2001 | Dettling | B01J 35/04 427/230 |
| 2004/0258582 A1* | 12/2004 | Miwa | B01D 45/16 422/177 |
| 2006/0057046 A1* | 3/2006 | Punke | B01D 53/944 422/177 |
| 2006/0270550 A1* | 11/2006 | Shimizu | B01D 53/945 502/325 |
| 2007/0238256 A1* | 10/2007 | Fischer | B01D 46/2418 438/303 |
| 2008/0081761 A1* | 4/2008 | Suzuki | B01D 53/945 502/304 |
| 2008/0241009 A1* | 10/2008 | Ohno | B01D 53/944 422/180 |
| 2014/0161693 A1* | 6/2014 | Brown | B01D 53/9431 422/180 |
| 2015/0033715 A1* | 2/2015 | Markatou | B01D 53/9472 60/299 |

* cited by examiner

HONEYCOMB STRUCTURE

The present application is an application based on JP-2016-027240 filed on Feb. 6, 2016 with Japan Patent Office, the entire contents of which are incorporated herein by reference.

BACKGROUND OF THE INVENTION

Field of the Invention

The present invention relates to a honeycomb structure, and more particularly, it relates to a honeycomb structure which is for use in exhaust gas purifying device to purify exhaust gas of a gasoline engine and is capable of preventing deterioration of purifying performance of the exhaust gas.

Description of the Related Art

In recent years, for various requests for resource saving, energy saving and the like, there has been advanced development of an engine which suppresses fuel consumption of fossil fuel such as gasoline, further suppresses an amount of exhaust gas to be generated, and exerts low fuel consumption performance. Especially in a gasoline engine which is usually employed as a drive source of a car, for the purpose of satisfying requirements of the above low fuel consumption, there has been advanced a technology concerned with a direct injection type gasoline engine in which the gasoline is directly injected into a cylinder to perform driving.

In the direct injection type gasoline engine, low fuel consumption can be achieved as compared with a conventional "port injection type" gasoline engine. On the other hand, an amount of particulate matter (PM) such as soot to be generated at start of the engine or during acceleration thereof might excessively increase as compared with the conventional gasoline engine. Therefore, the exhaust gas including the generated particulate matter is discharged to the atmosphere through an appropriate treatment.

In the case of a diesel engine, for the purpose of removing the particulate matter in the exhaust gas generated by an operation of the engine, there is attached a trapping filter (exhaust gas purifying device) in which a honeycomb structure is used. As the honeycomb structure for use in the trapping filter, a plugged honeycomb structure is used which includes plugging portions to plug both end faces in accordance with a predetermined arrangement standard (e.g., see Patent Document 1). Consequently, the exhaust gas flows into the plugged honeycomb structure, and passes through partition walls of the plugged honeycomb structure made of a porous ceramic material, whereby the particulate matter is trapped by the partition walls.

Similarly to the above trapping filter for the diesel engine, there is performed development of a trapping filter suitable for the gasoline engine in which the honeycomb structure is used. As a result, it is possible to remove the particulate matter from the exhaust gas and to discharge the purified gas to the atmosphere. Here, when the above trapping filter is attached to the gasoline engine, there is the possibility that pressure loss increases to adversely affect running performance.

Therefore, depending on specifications of a vehicle in which the gasoline engine is mounted, the trapping filter can be designed to slightly decrease trapping efficiency of the particulate matter, thereby suppressing the pressure loss. In this case, it has been suggested to use, as the trapping filter, the honeycomb structure of a one-side plugging structure in which plugging portions are provided only on one end face side of the honeycomb structure in accordance with a predetermined arrangement standard.

[Patent Document 1] JP-A-2003-254034

SUMMARY OF THE INVENTION

As a honeycomb structure for use as a trapping filter, a honeycomb catalyst body can be utilized in which a catalyst is impregnated into porous partition walls made of a ceramic material. Due to an operation of the catalyst impregnated into the partition walls, purifying performance of exhaust gas can remarkably improve. At this time, in the case of a usual plugged honeycomb structure in which one end face side and the other end face side are plugged, the exhaust gas which passes through the partition walls surely comes in contact with the catalyst.

However, in the case of a honeycomb structure of a one-side plugging structure in which plugging portions are provided only on one end face side to suppress pressure loss, a part of the exhaust gas intrudes into cells in which plugging portions are not provided in both end faces, and flows through the cells along an axial direction of the honeycomb structure. As a result, the exhaust gas does not come in contact with the catalyst, and the exhaust gas might be emitted from the other end face. Thus, the exhaust gas is not subjected to a purifying operation by the catalyst and purifying efficiency of the exhaust gas might deteriorate. That is, in a case of coating each of the honeycomb structures of the usual plugging structure and the one-side plugging structure with the same amount of the catalyst, there is the possibility that the purifying performance of the exhaust gas remarkably deteriorates in the honeycomb structure of the one-side plugging structure.

To eliminate such problems, the present invention has been developed in view of the above circumstances, and an object thereof is to provide a honeycomb structure which is capable of suppressing pressure loss, increasing opportunities of contact between exhaust gas and a catalyst, and exerting suitable exhaust gas purifying performance even in a case where the honeycomb structure has a one-side plugging structure.

According to the present invention, there is provided a honeycomb structure which achieves the above object.

According to a first aspect of the present invention, a honeycomb structure is provided including a honeycomb substrate having porous partition walls defining a plurality of cells extending from one end face to the other end face, and one-side plugging portions configured to plug the cells in the one end face in accordance with a predetermined arrangement standard, wherein the partition walls include catalyst impregnated partition walls formed in a first region of a predetermined length extending from the one end face in which the one-side plugging portions are provided, along an axial direction of the honeycomb substrate and formed by impregnating a catalyst into inner portions of the partition walls, and catalyst layer partition walls formed in a second region of a predetermined length extending from the other end face along the axial direction of the honeycomb substrate and having catalyst layers which coat the surfaces of the partition walls with the catalyst in the form of layers.

According to a second aspect of the present invention, the honeycomb structure according to the above first aspect is provided, wherein a ratio of the length of the first region to a total length of the honeycomb substrate in the axial direction is in a range of ⅓ to ⅔, and a ratio of the length of the second region to the total length of the honeycomb substrate in the axial direction is in a range of ⅓ to ⅔.

According to a third aspect of the present invention, the honeycomb structure according to the above first or second aspects is provided, which further has, between the first region and the second region, a third region of a predetermined length extending along the axial direction of the honeycomb substrate, wherein the third region includes both of the catalyst impregnated partition wall and the catalyst layer partition wall, or does not include the catalyst impregnated partition wall and the catalyst layer partition wall.

According to a fourth aspect of the present invention, the honeycomb structure according to any one of the above first to third aspects is provided, wherein as the catalyst, a three-way catalyst is used.

According to a honeycomb structure of the present invention, it is possible to inhibit increase of pressure loss and it is possible to prevent deterioration of purifying performance of exhaust gas by each of a catalyst impregnated into partition walls and a catalyst which coats the surfaces of the partition walls in the honeycomb structure including one-side plugging portions.

DESCRIPTION OF THE PREFERRED EMBODIMENTS

Hereinafter, embodiments of a honeycomb structure of the present invention will be described in detail with reference to the drawings. It is to be noted that the honeycomb structure of the present invention is not especially limited to the following embodiments, and various design changes, modifications, improvements and the like can be added without departing from the gist of the present invention.

(1) Honeycomb Structure

Figure 1:
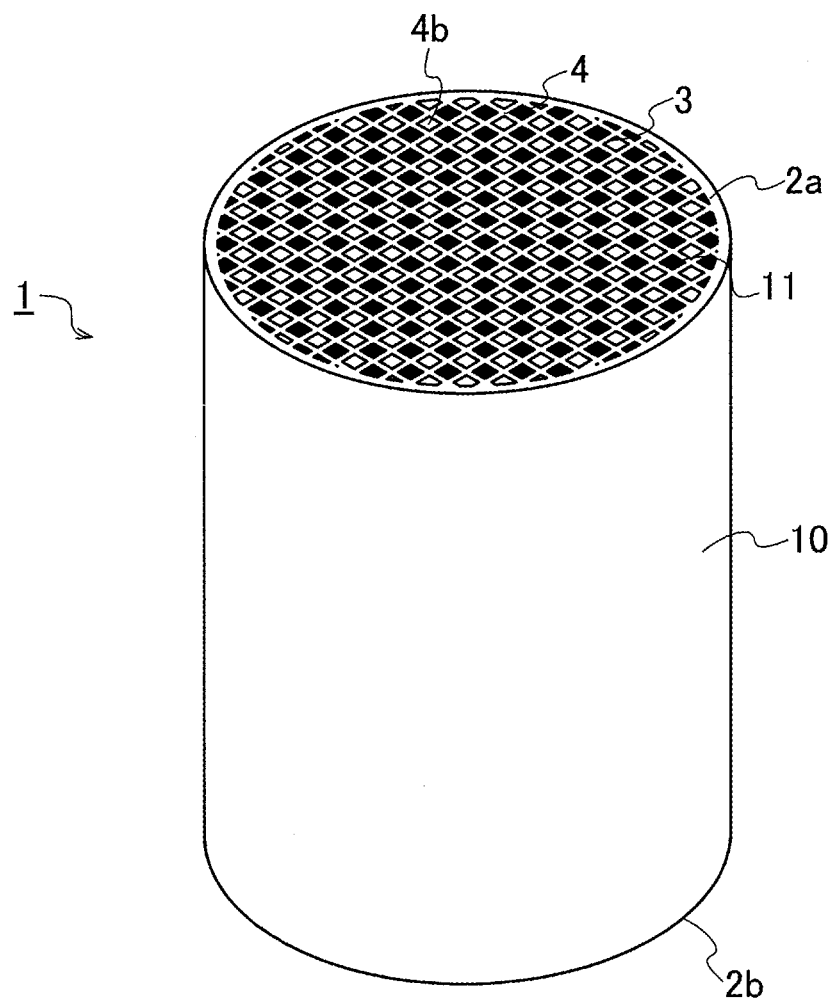
FIG. 1 is a perspective view schematically showing an outline constitution of one end face side of a honeycomb structure according to one embodiment of the present invention.
Figure 2:
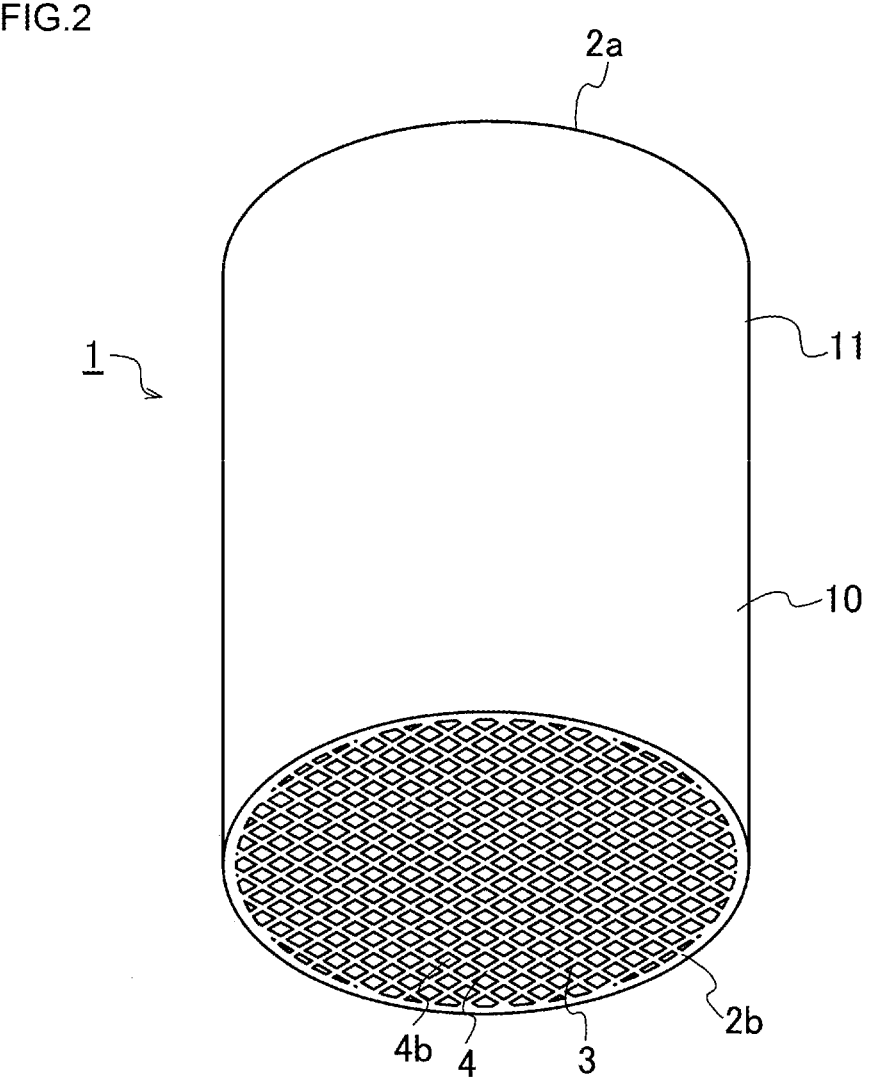
FIG. 2 is a perspective view schematically showing an outline constitution of the other end face side of the honeycomb structure according to the present embodiment.

As shown mainly in FIG. 1 and FIG. 2, a honeycomb structure 1 of the present embodiment is mainly constituted of a substantially round pillar-shaped honeycomb substrate 10 having lattice-like partition walls 4 made of a porous ceramic material and defining a plurality of cells 3 extending from one end face 2a to the other end face 2b, and one-side plugging portions 11 configured to plug the cells 3 in the one end face 2a in accordance with a predetermined arrangement standard.

The cells 3 on the side of the one end face 2a of the honeycomb substrate 10 are alternately plugged with the one-side plugging portions 11 of the honeycomb structure 1 of the present embodiment, and the plugging portions are arranged in accordance with an arrangement standard of a hound's-tooth check (a checked pattern or a checkerboard pattern) as a whole (see FIG. 1). It is to be noted that on the side of the other end face 2b, such plugging is not performed, and all the cells 3 are open (see FIG. 2). Consequently, in a case where exhaust gas EG flows from the one end face 2a side of the honeycomb structure 1 toward the other end face 2b side thereof, the honeycomb structure has the advantage of inhibiting increase of pressure loss as compared with a usual plugged honeycomb structure (not shown) in which the one end face 2a and the other end face 2b are alternately plugged. In consequence, in a case of purifying the exhaust gas EG, there is not the fear of deterioration of running performance of a vehicle in which exhaust gas purifying device formed by using the honeycomb structure 1 of the present embodiment is mounted.

Figure 3:
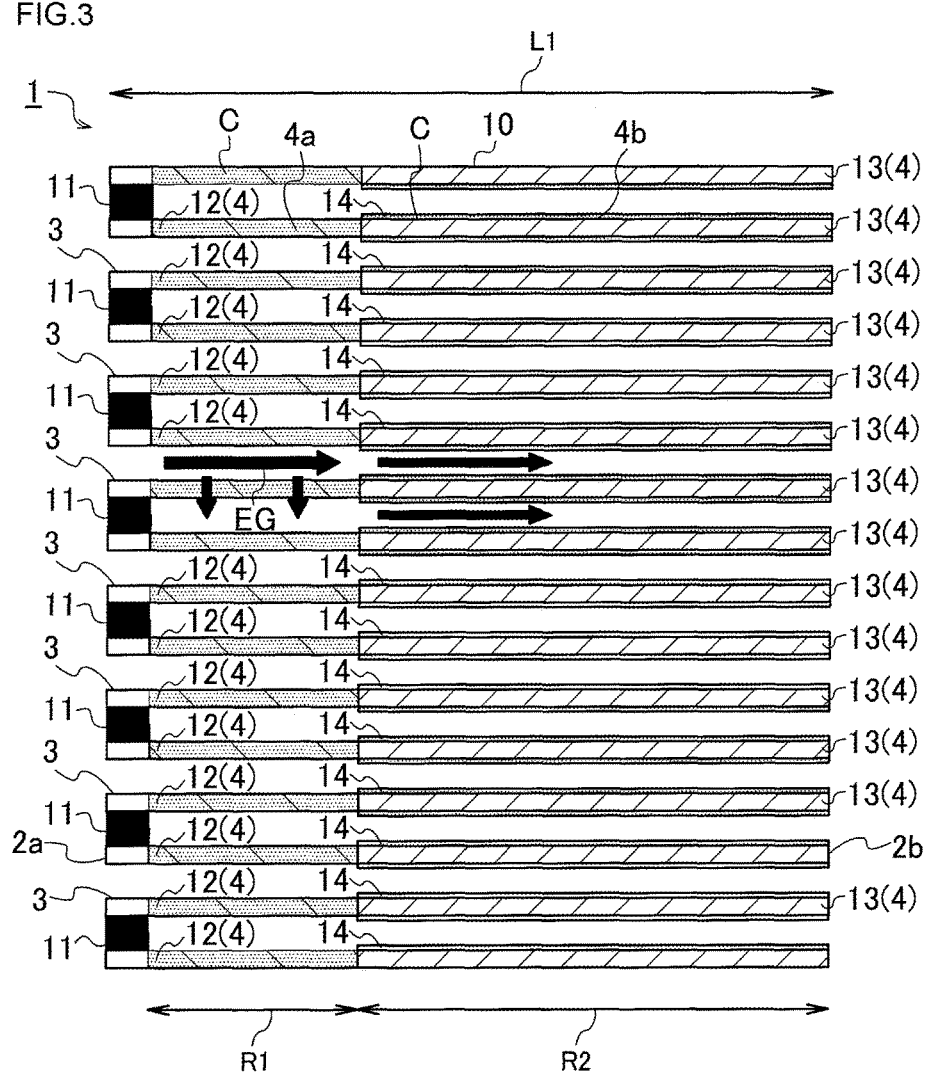
FIG. 3 is an explanatory view schematically showing a cross section of the honeycomb structure of the present embodiment which is parallel to an axial direction thereof.

As schematically shown in FIG. 3, the honeycomb structure 1 of the present embodiment has catalyst impregnated partition walls 12 and catalyst layer partition walls 13 in the honeycomb substrate 10. Further specifically, the honeycomb structure includes the catalyst impregnated partition walls 12 formed in a first region R1 of a predetermined length extending from the one end face 2a in which the one-side plugging portions 11 are provided, along an axial direction of the honeycomb substrate 10 (which corresponds to a left direction to a right direction of a paper surface in FIG. 3) and formed by impregnating a catalyst C into partition wall inner portions 4a of the partition walls 4, and catalyst layer partition walls 13 formed in a second region R2 of a predetermined length extending from the other end face 2b along the axial direction of the honeycomb substrate 10 (which corresponds to the right direction to the left direction of the paper surface in FIG. 3) and having catalyst layers 14 which coat partition wall surfaces 4b of the partition walls 4 with the catalyst C in the form of layers.

Here, the catalyst impregnated partition wall 12 is defined as the partition wall 4 of a case where "a mass of the catalyst loaded into pores" is 80% or more in a cross section of the partition wall which extends along a thickness direction. Furthermore, the catalyst layer partition wall 13 having the catalyst layer 14 which coats the partition wall surface 4b with the catalyst in the form of the layer is defined as the partition wall of a case where "a mass of the catalyst" loaded into pores is 30% or less of "the mass of the catalyst constituting the catalyst layer 14". It is to be noted that determination of the catalyst impregnated partition wall 12 and the catalyst layer partition wall 13 on the basis of these mass ratios can be performed in accordance with an area ratio obtained when an SEM image obtained by photographing the cross section of the partition wall 4 along the thickness direction by a scanning electronic microscope (SEM) is subjected to image processing.

A part of the exhaust gas EG flowing from the cells 3 opened on the one end face 2a side into the honeycomb substrate 10 (from the left side to the right side of the paper surface in FIG. 3) passes through the partition wall inner portions 4a of the first region R1 formed in the vicinity of the one end face 2a while expanding in a direction perpendicular to the axial direction of the honeycomb substrate 10. Further, the exhaust gas passes through the partition wall inner portions 4a, and then flows toward the other end face 2b side (see arrows in FIG. 3). Consequently, when the exhaust gas passes through the partition wall inner portions 4a, the catalyst C impregnated into the partition walls 4 comes in contact with the exhaust gas EG, particulate matter (not shown) such as soot is trapped by the porous partition walls 4, and it is possible to purify the exhaust gas EG by purifying performance of the catalyst in contact.

On the other hand, the residual exhaust gas EG which does not pass through the partition walls 4 penetrates from the cells 3 opened on the one end face 2a side into the honeycomb substrate 10, passes through the first region R1 along the axial direction of the honeycomb substrate 10, and further travels through the cells 3 of the second region R2 similarly along the axial direction. At this time, the catalyst layers 14 which coat the partition wall surfaces 4b in the form of the layers are formed on the partition wall surfaces 4b. Therefore, the exhaust gas EG traveling through the second region R2 comes in contact with the catalyst layers 14 of the partition wall surfaces 4b. Consequently, a catalytic operation to the exhaust gas EG is exerted. In consequence, as compared with a conventional plugged honeycomb structure, it is possible to suppress the pressure loss, it is possible to trap the particulate matter by the partition walls 4, and it is possible to obtain purifying effect of the exhaust gas EG by the catalyst C in the partition wall inner portions 4a and the catalyst layers 14.

(2) Catalyst, and Formation of Catalyst Impregnated Partition Wall and Catalyst Layer Partition Wall In the honeycomb structure 1 of the present embodiment, as the catalyst C which is impregnated into the partition wall inner portions 4a and coats the partition wall surfaces 4b, for example, "a three-way catalyst" is usable. The three-way catalyst is a catalyst to mainly purify hydrocarbons (HC), carbon monoxide (CO) and nitrogen oxides ($NO_x$), and may include, for example, platinum (Pt), palladium (Pd), and rhodium (Rh). The three-way catalyst purifies hydrocarbons into water and carbon dioxide, carbon monoxide into carbon dioxide, and nitrogen oxides into nitrogen by oxidation or reductive reaction.

Furthermore, as a technique of forming the catalyst impregnated partition walls 12 and the catalyst layer partition walls 13 to the honeycomb substrate 10, a well-known technique is utilizable. For example, the above catalyst C is added to a liquid medium such as water or alcohol, to prepare a catalyst solution having a comparatively low viscosity. Further, the one end face 2a side of the honeycomb substrate is directed downward, the honeycomb substrate 10 is gradually brought close to the catalyst solution from the above, and the honeycomb substrate 10 is dipped down to a predetermined depth (corresponding to the first region R1) (dipping). After predetermined dipping time elapses, the honeycomb substrate 10 is lifted up from the catalyst solution and is dried. Consequently, the catalyst C is impregnated into the partition wall inner portions 4a of the first region R1 to form the catalyst impregnated partition walls 12. The partition walls 4 are made of the porous ceramic material, so that the catalyst solution penetrates into the pores of the partition walls 4, and the catalyst C can be impregnated.

On the other hand, in the technique of forming the catalyst layer partition walls 13, for example, a catalyst solution for the catalyst layers 14 is prepared by adjusting its viscosity to be higher than a viscosity of the above catalyst solution to form the catalyst impregnated partition walls 12, the other end face 2b side of the honeycomb substrate is directed downward, the honeycomb substrate 10 is gradually brought close to the catalyst solution from the above, and the honeycomb substrate 10 is dipped down to a predetermined depth (corresponding to the second region R2) (dipping). After predetermined dipping time elapses, the honeycomb substrate 10 is lifted up from the catalyst solution and is dried. Consequently, it is possible to obtain the catalyst layer partition walls 13 in which the catalyst layers 14 are formed on the partition wall surfaces 4b of the second region R2.

By using the catalyst solution having the viscosity higher than that of the catalyst impregnated partition walls 12, the catalyst solution penetrates only into the pores of the partition wall surfaces 4b of the partition walls 4, and penetration into the partition wall inner portions 4a of the partition walls 4 is regulated. Consequently, the catalyst layers 14 are formed as the layers on the partition wall surfaces 4b. In the honeycomb structure of the present invention, the formation of the catalyst impregnated partition walls 12 and the catalyst layer partition walls 13 mentioned above are not limited to the following examples, and may be formed by various techniques.

Here, a ratio of the length of the first region R1 to a total length L1 of the honeycomb substrate 10 is in a range of ⅓ to ⅔ (33% to 66%) and more preferably in a range of ½ to ⅔ (50% to 66%). On the other hand, a ratio of the length of the second region R2 to the total length L1 of the honeycomb substrate 10 is in a range of ⅓ to ⅔ (33% to 66%) and more preferably in a range of ½ to ⅓ (50% to 66%).

That is, as compared with the length of the second region R2, the length of the first region R1 decreases. Here, when the first region R1 is excessively short (i.e., when the second region R2 is excessively long), an amount of the exhaust gas EG to pass through the partition wall inner portions 4a decreases, and trapping efficiency of the particulate matter remarkably deteriorates. On the other hand, when the first region R1 is excessively long (i.e., when the second region R2 is excessively short), there decrease opportunities of contact between the exhaust gas EG which does not pass through the partition wall inner portions 4a and flows through the cells 3 along the axial direction and the catalyst C (the catalyst layers 14), and it is not possible to obtain a sufficiently purifying operation by the catalyst C. Consequently, in the honeycomb structure of the present invention, the ratio of the length between the first region R1 and the second region R2 is determined in the above range to the total length L1 of the honeycomb substrate 10.

(3) Third Region

Figure 4:
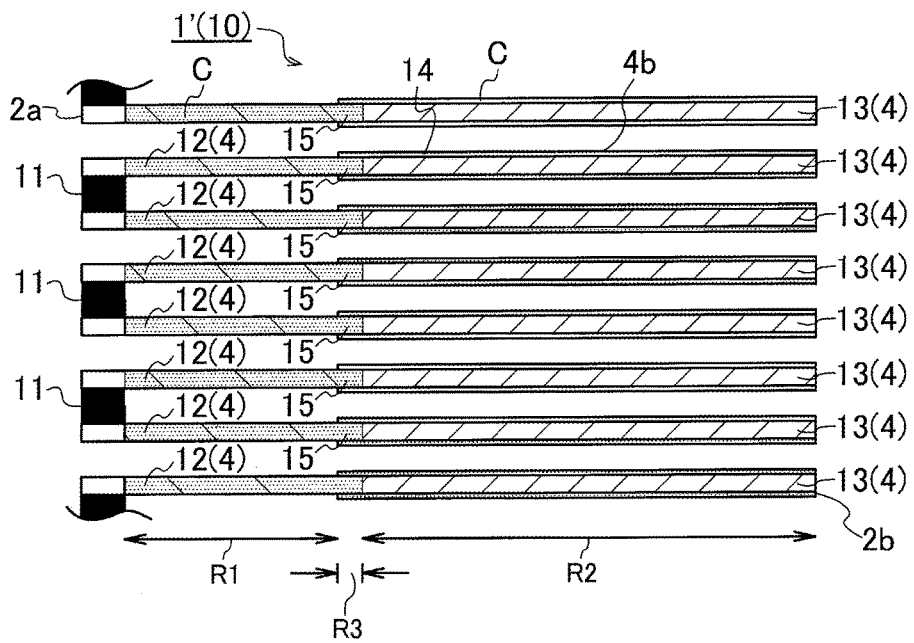
FIG. 4 is a partially enlarged explanatory view schematically showing a cross section of another example constitution of the honeycomb structure of the present invention which is parallel to the axial direction thereof.

Furthermore, the honeycomb structure of the present invention may have a third region R3 between the first region R1 and the second region R2. For example, as shown in FIG. 4, a honeycomb structure 1' of another example constitution of the present invention includes the third region R3 having catalyst sharing portions 15 formed so that catalyst impregnated partition walls 12 overlap with catalyst layer partition walls 13. The honeycomb structure has the catalyst sharing portions 15, so that it is possible to produce operation effects of both the catalyst impregnated partition wall 12 and the catalyst layer partition wall 13. However, there is the possibility that the catalyst layer 14 formed on the partition wall surface 4b obstructs the passing of the exhaust gas EG through the partition wall inner portion 4a in the third region R3, thereby increasing the pressure loss.

Figure 5:
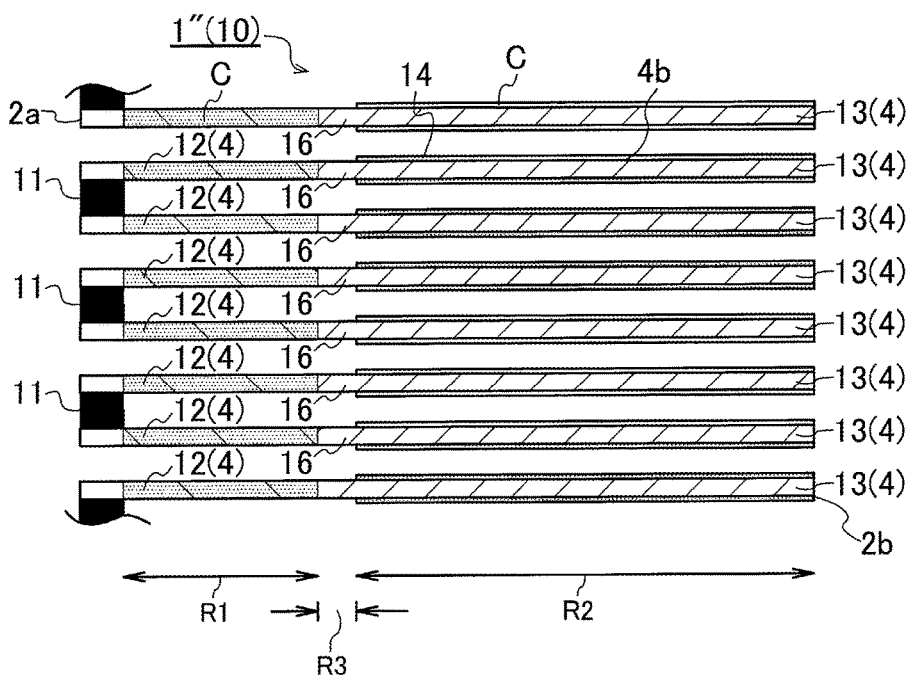
FIG. 5 is a partially enlarged explanatory view schematically showing a cross section of still another example constitution of the honeycomb structure of the present invention which is parallel to the axial direction thereof.

On the other hand, as shown in FIG. 5, a honeycomb structure 1" of still another example constitution includes, between a first region R1 and a second region R2, a third region R3 having non-catalyst portions 16 which are not catalyst impregnated partition walls 12 or catalyst layer partition walls 13. The honeycomb structure has the non-catalyst portions 16, and hence the exhaust gas EG passes without producing any purifying effect of a catalyst C in partition wall inner portions 4a.

The catalyst sharing portions 15 or the non-catalyst portions 16 are provided in the third region R3 mentioned above, which enables simplification of the operation of dipping the honeycomb substrate 10 in the catalyst solution and forming the respective catalyst impregnated partition walls 12 and the respective catalyst layer partition walls 13. That is, it is not necessary to accurately perform positioning for the dipping when dipping the honeycomb substrate 10 in the catalyst solution. Therefore, operation efficiency to manufacture the honeycomb structure of the present embodiment improves.

Hereinafter, examples of the honeycomb structure of the present invention will be described, but the honeycomb structure of the present invention is not especially limited to these examples.

EXAMPLES

Table 1 mentioned below shows a summary of a honeycomb structure diameter, a length (a total length), a cell density, a partition wall thickness, a porosity, a pore diameter, a plugging pattern, a first region length, a second region length, presence/absence of a third region, and a catalyst coat amount of each of Examples 1 to 7 and Comparative Examples 1 and 2 of the honeycomb structure of the present invention, and further, a reference honeycomb.

Here, as the honeycomb structures of the examples, comparative examples and reference honeycomb, there are used honeycomb structures of the same specifications in which the diameter is 118.4 mm, the length is 127 mm, the cell density is 46.5 cells/cm$^2$, the partition wall thickness is 216 μm, the porosity is the same, and the pore diameter is 20 μm, and the catalyst coat amount is also the same. That is, the plugging pattern is formed at an inlet or an outlet, and parameters such as the first region length, the second region length and the presence/absence of the third region are changed.

Here, in the reference honeycomb, plugging portions are formed in both of one end face and the other end face in accordance with a predetermined arrangement standard. Furthermore, in Comparative Example 1, plugging portions are formed only on an inlet side (one end face side), and a first region is only disposed to all through channels. In Comparative Example 2, plugging portions are formed only on an inlet side and a second region is only disposed to all through channels.

On the other hand, in each of Examples 1 to 7, lengths of a first region and a second region to a total length of a honeycomb substrate (a length in Table 1) are changed, and each of the first region length and the second region length is changed in a range of 32 mm to 95 mm (25% to 75%). Furthermore, Example 3 has a third region in which a first region overlaps with a second region, and a length of an overlapping portion is 20 mm.

For the honeycomb structure of each of Examples 1 to 7, Comparative Examples 1 and 2 and the reference honeycomb mentioned above, (1) a purifying ratio, (2) the number of particles of a PM to be emitted and (3) pressure loss were measured in accordance with measuring methods which will be described later, respectively, and the items (1) to (3) were evaluated, respectively. Furthermore, (4) a general evaluation of exhaust gas purifying device was carried out on the basis of evaluations of (1) to (3).

(1) Measuring Method of Purifying Ratio

The exhaust gas purifying device to which there was attached each of the honeycomb structures of the abovementioned examples, comparative example and reference honeycomb was attached to an exhaust system of a car in which a direct injection type gasoline engine having a displacement of 2.0 liters was mounted. Afterward, there were measured emissions of carbon monoxide (CO), hydrocarbons (HC) and nitrogen oxides (NO$_x$) in exhaust gas when the car was driven in accordance with driving conditions of Worldwide harmonized Light-duty driving Test Cycle (WLTC) as a vehicle test by use of a chassis dynamometer, to obtain an emission value. The obtained emission value was compared with a value of the honeycomb structure of a reference, a case where an increase value of all components of carbon monoxide, hydrocarbons and nitrogen oxides was 0% or more and smaller than 10% was evaluated as "A", a case where the value was in a range of 10% or more and smaller than 20% was evaluated as "B", and a case where the value was 20% or more was evaluated as "C". It is to be noted that Table 2 shows "a purifying ratio (CO, HC, NO$_x$)" as an evaluation item concerned with measurement of the purifying ratio.

(2) Measuring Method of Number of Particles of PM to Be Emitted

The exhaust gas purifying device to which there was attached each of the honeycomb structures concerned with the examples, comparative examples and reference honeycomb was attached to the exhaust system of the car in which the direct injection type gasoline engine having the displacement of 2.0 liters was mounted. Afterward, there was measured the number of the particles of the PM to be emitted in exhaust gas when the car was driven in accordance with the driving conditions of Worldwide harmonized Light-duty driving Test Cycle (WLTC) as the vehicle test by use of the chassis dynamometer, on the basis of a method conforming

TABLE 1

| | Diameter/ mm | Length/ mm | Cell density/ cells/ cm$^2$ | Partition wall thickness/ μm | Porosity/% | Pore diameter/ μm | Plugging pattern | First region length*/ mm | Second region length**/ mm | Presence of third region | Catalyst coat amount/ g/l |
|---|---|---|---|---|---|---|---|---|---|---|---|
| Reference honeycomb | 118.4 | 127 | 46.5 | 216 | 65 | 20 | Both faces | 127 (100%) | 0 (0%) | 0 | 100 |
| Comparative Example 1 | 118.4 | 127 | 46.5 | 216 | 65 | 20 | Inlet | 127 (100%) | 0 (0%) | None | 100 |
| Comparative Example 2 | 118.4 | 127 | 46.5 | 216 | 65 | 20 | Inlet | 0 (0%) | 127 (100%) | None | 100 |
| Example 1 | 118.4 | 127 | 46.5 | 216 | 65 | 20 | Inlet | 42 (33%) | 85 (66%) | None | 100 |
| Example 2 | 118.4 | 127 | 46.5 | 216 | 65 | 20 | Inlet | 85 (66%) | 42 (33%) | None | 100 |
| Example 3 | 118.4 | 127 | 46.5 | 216 | 65 | 20 | Inlet | 95 (75%) | 52 (41%) | Present | 100 |
| Example 4 | 118.4 | 127 | 46.5 | 216 | 65 | 20 | Inlet | 95 (75%) | 32 (25%) | None | 100 |
| Example 5 | 118.4 | 127 | 46.5 | 216 | 65 | 20 | Inlet | 75 (60%) | 52 (41%) | None | 100 |
| Example 6 | 118.4 | 127 | 46.5 | 216 | 65 | 20 | Outlet | 95 (75%) | 32 (25%) | None | 100 |
| Example 7 | 118.4 | 127 | 46.5 | 216 | 65 | 20 | Outlet | 32 (25%) | 95 (75%) | None | 100 |

*In parentheses, there is indicated a ratio of the length of the first region to the total length of the honeycomb substrate in the axial direction.
**In parentheses, there is indicated a ratio of the length of the second region to the total length of the honeycomb substrate in the axial direction.

to European EURO6 proposed regulations. Here, a case where the number of the particles of the PM to be emitted was $3\times10^{11}$ particles/km or less was evaluated as "A", a case where the number was in a range of $3\times10^{11}$ to $6\times10^{11}$ particles/km was evaluated as "B", and a case where the number was $6\times10^{11}$ particles/km or more was evaluated as "C".

(3) Measuring Method of Pressure Loss

In a chassis test of the direct injection type gasoline engine having the displacement of 2.0 liters, there was first attached, to the exhaust system, a honeycomb structure (a reference honeycomb) whose both ends were plugged and which had a cell density of 46.5 cells/cm², a partition wall thickness of 216 μm, a honeycomb diameter of 118.4 mm, a honeycomb length of 127 mm and a catalyst coat amount of 100 g/l. At this time, pressure loss during a full load operation of the engine was measured and this value was defined as a reference value of the pressure loss. The exhaust gas purifying device in which there was used each of the honeycomb structures concerned with the examples and comparative examples was similarly attached to the exhaust system of the car in which the direct injection type gasoline engine having the displacement of 2.0 liters was mounted, and the pressure loss during the full load operation of the engine on the same conditions as described above was measured. Afterward, as compared with the reference value of the pressure loss which was obtained by the reference, a case where a decrease of the pressure loss was 40% or more was evaluated as "A", a case where the decrease of the pressure loss was 20% or more and smaller than 40% was evaluated as "B", and a case where the decrease of the pressure loss was 20% or less was evaluated as "C".

(4) General Judgment

In the respective evaluation items of (1) the purifying ratio (CO, HC, $NO_x$), (2) the number of the particles of the PM to be emitted and (3) the pressure loss mentioned above, a case where all the evaluation items were "A" or at least two evaluation items were "A" was generally judged as "A", a case where two of the evaluation items were "B" was generally judged as "B", and a case where even one of the items was "C" was generally judged as "C". In the general judgment, "A" and "B" indicate pass, and "C" indicates failure.

TABLE 2

| | Purifying ratio (CO, HC, $NO_x$)/% | PM to be emitted/ particle/km | Pressure loss (decrease %) | General judgment |
|---|---|---|---|---|
| Comparative Example 1 | C | B | A | C |
| Comparative Example 2 | B | C | B | C |
| Example 1 | A | B | B | B |
| Example 2 | A | A | A | A |
| Example 3 | A | B | B | B |
| Example 4 | B | A | A | A |
| Example 5 | A | B | B | B |
| Example 6 | B | A | B | B |
| Example 7 | A | A | B | A |

As shown in Table 2, it has been confirmed that in the case of Comparative Example 1 where a length of a first region was 100% to a total length of a honeycomb substrate, an effect of decrease of pressure loss was present, but the purifying ratio (CO, HC, $NO_x$) was remarkably poor. On the other hand, in the case of Comparative Example 2 where a length of a second region was 100% to a total length of a honeycomb substrate, especially the evaluation of the number of the particles of the PM to be emitted was low. Consequently, in the example where one of the first region and the second region was only provided as much as 100% to the total length of the honeycomb substrate, low evaluation was only obtained in the general judgment.

On the other hand, in the honeycomb structures of Examples 1 to 7 satisfying conditions determined in the present invention, the evaluation of at least B was obtained in each item. For example, comparison of Example 1 and Example 2 has clarified that, in a case of providing one-side plugging portions on an inlet side (one end face side) and changing each of the lengths of the first region and the second region, the honeycomb structure in which the first region is longer than the second region achieves a suitable result. Especially, the honeycomb structure of Example 2 obtained the judgment A in all of the three evaluation items. It is to be noted that when the first region is excessively long, deterioration of the purifying ratio is confirmed (Example 4).

On the other hand, comparison of Example 6 and Example 7 has clarified that in a case of providing one-side plugging portions on an outlet side (the other end face side), a tendency reverse to the above tendency is recognized and that the honeycomb structure in which the second region is longer than the first region obtains a suitable result. Furthermore, it has been confirmed that even in the honeycomb structure having the third region in which the first region overlaps with the second region (Example 3), a practically sufficient function is exerted.

The honeycomb structure of the present invention is suitably utilizable especially in a trapping filter (an exhaust gas purifying device) to trap and purify particulate matter from exhaust gas of a gasoline engine.

DESCRIPTION OF REFERENCE NUMERALS

1: honeycomb structure, 2a: one end face, 2b: other end face, 3: cell, 4: partition wall, 4a: partition wall inner portion, 4b: partition wall surface, 10: honeycomb substrate, 11: one-side plugging portion, 12: catalyst impregnated partition wall, 13: catalyst layer partition wall, 14: catalyst layer, 15: catalyst sharing portion, 16: non-catalyst portion, C: catalyst, EG: exhaust gas, L1: total length of the honeycomb substrate, R1: first region, R2: second region, and R3: third region.

What is claimed is:

1. A honeycomb structure comprising:
   a honeycomb substrate having porous partition walls defining a plurality of cells extending from one end face to an other end face; and
   one-side plugging portions configured to plug the cells in only the one end face in accordance with a predetermined arrangement standard,
   wherein the partition walls comprise:
   catalyst impregnated partition walls formed in a first region of a predetermined length extending from the one end face in which the one-side plugging portions are provided, along an axial direction of the honeycomb substrate and formed by impregnating a catalyst into inner portions of the partition walls, and
   catalyst layer partition walls formed in a second region of a predetermined length extending from the other end face along the axial direction of the honeycomb substrate and having catalyst layers which coat the surfaces of the partition walls with the catalyst in the form of layers.

2. The honeycomb structure according to claim 1, wherein a ratio of the length of the first region to a total length of the honeycomb substrate in the axial direction is in a range of ⅓ to ⅔, and a ratio of the length of the second region to the total length of the honeycomb substrate in the axial direction is in a range of ⅓ to ⅔.

3. The honeycomb structure according to claim 1, which further comprises, between the first region and the second region, a third region of a predetermined length extending along the axial direction of the honeycomb substrate, wherein the third region includes both of the catalyst impregnated partition wall and the catalyst layer partition wall, or does not include the catalyst impregnated partition wall and the catalyst layer partition wall.

4. The honeycomb structure according to claim 1, wherein as the catalyst, a three-way catalyst is used.

* * * * *